US006386431B1

(12) United States Patent
Lin

(10) Patent No.: US 6,386,431 B1
(45) Date of Patent: May 14, 2002

(54) VACUUM INSULATED COFFEE SERVER MANUFACTURING PROCESS

(76) Inventor: Shin-Shuoh Lin, 27022 Falling Leaf Dr., Laguna Hills, CA (US) 92653

( * ) Notice: Subject to any disclaimer, the term of this patent is extended or adjusted under 35 U.S.C. 154(b) by 0 days.

(21) Appl. No.: 09/764,235

(22) Filed: Jan. 19, 2001

(51) Int. Cl.⁷ .................................................. B23K 1/20
(52) U.S. Cl. ........................ 228/223; 228/140; 228/224; 228/248.1; 220/410
(58) Field of Search ................................ 228/135, 139, 228/140, 218, 223, 224, 245, 248.1; 220/410, 421, 719

(56) References Cited

U.S. PATENT DOCUMENTS

| | | | |
|---|---|---|---|
| 2,895,636 A | * 7/1959 | Martin | 215/12.1 |
| 3,189,229 A | * 6/1965 | Carroll et al. | 215/12.1 |
| 3,191,794 A | * 6/1965 | Perkins | 220/560.12 |
| 3,355,046 A | * 11/1967 | Jolly | 215/13.1 |
| 3,684,123 A | * 8/1972 | Bridges | 206/503 |
| 3,891,565 A | * 6/1975 | Colpoys | 166/278 |
| 4,473,161 A | * 9/1984 | Zimmerman | 215/13.1 |
| 4,595,437 A | * 6/1986 | Yamamoto | 156/293 |
| 4,618,066 A | * 10/1986 | Vail | 215/13.1 |
| 4,754,888 A | 7/1988 | Letch et al. | |
| 5,249,703 A | 10/1993 | Karp | |
| D346,933 S | 5/1994 | Denny et al. | |
| D362,156 S | 9/1995 | Goto et al. | |
| D362,369 S | 9/1995 | Bridges | |
| 5,515,995 A | * 5/1996 | Allen et al. | 215/13.1 |
| D372,838 S | 8/1996 | Feltman et al. | |
| D373,051 S | 8/1996 | Kramer et al. | |
| D386,948 S | 12/1997 | Wissinger | |
| D396,777 S | 8/1998 | Inoue | |
| D398,187 S | 9/1998 | Parker | |
| D411,713 S | 6/1999 | Bridges | |
| 5,918,761 A | 7/1999 | Wissinger | |
| 5,946,936 A | * 9/1999 | Bengtson | 62/457.2 |
| D416,757 S | 11/1999 | Ginuntoli | |
| D417,819 S | 12/1999 | Kelly-Pollet | |
| D425,758 S | 5/2000 | Freed | |

* cited by examiner

Primary Examiner—Tom Dunn
Assistant Examiner—Colleen P. Cooke
(74) Attorney, Agent, or Firm—Gordon K. Anderson

(57) ABSTRACT

A process for manufacturing a vacuum insulated stainless steel coffee server, which includes the steps of welding an outer shell (32) to an inner liner (34) then placing a ceramic ring (38) in a vacuum base (40) and slipping the vacuum base on the shell with the spacer forming a welding gap therebetween. The next step is welding the vacuum base to the shell at the welding gap formed by the ring and applying brazing powder and flux around a hole (36) in the liner, followed by inserting a threaded coupling (48) through the hole and a mating bore (42) in the base, with a first nut (52) on the coupling acting as a shoulder. The next step is applying brazing powder and flux around the nut and the bore in the vacuum base and then positioning the coffee server in a vacuum furnace and evacuating, while simultaneously elevating the temperature joining the coupling to the contiguous structure. The final step is removing the coffee server from the furnace and nesting a cup shaped outer base (54) over the shell and positioning a handle (58) onto the threaded coupling and attaching with a second internally threaded nut (60).

14 Claims, 6 Drawing Sheets

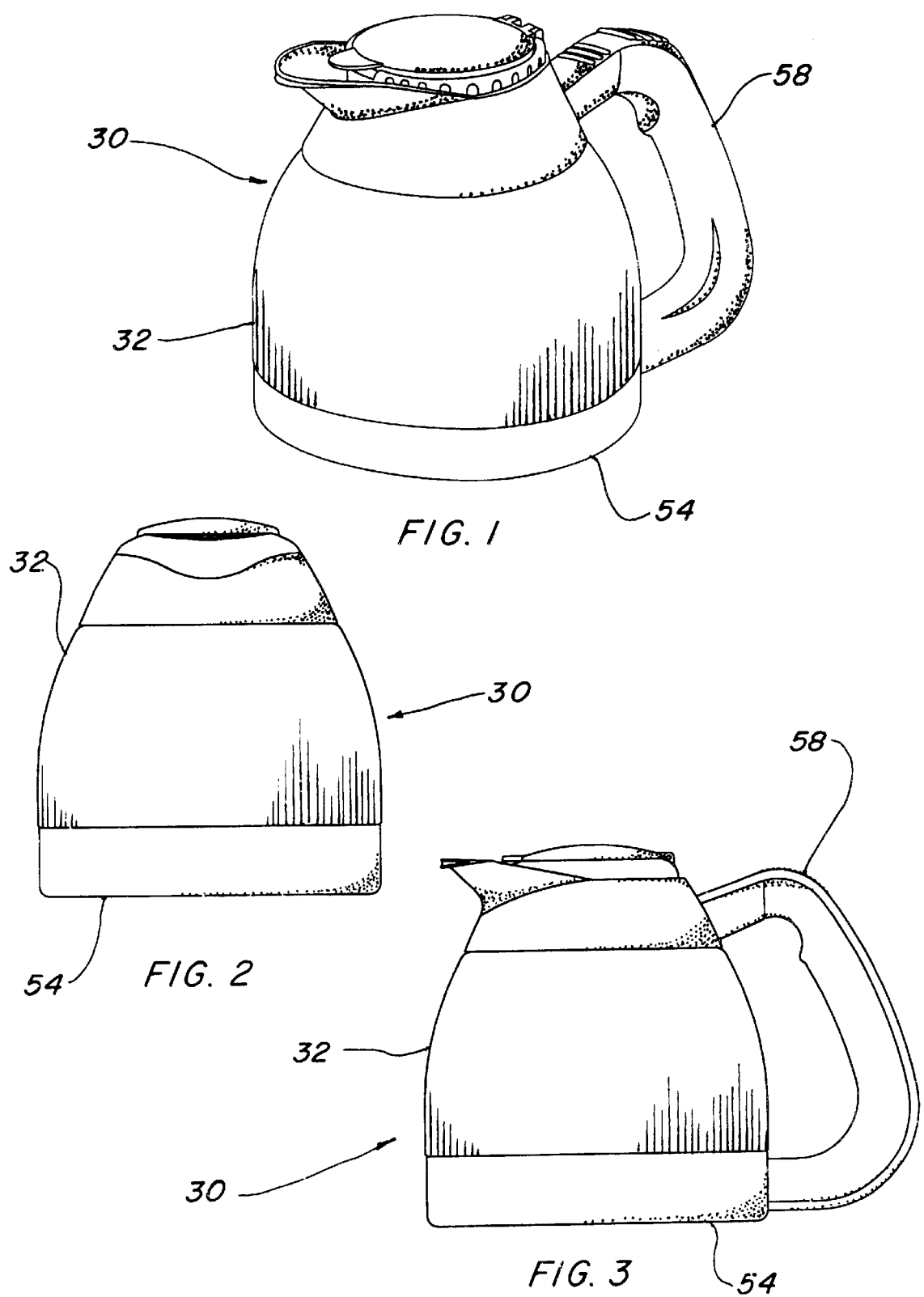

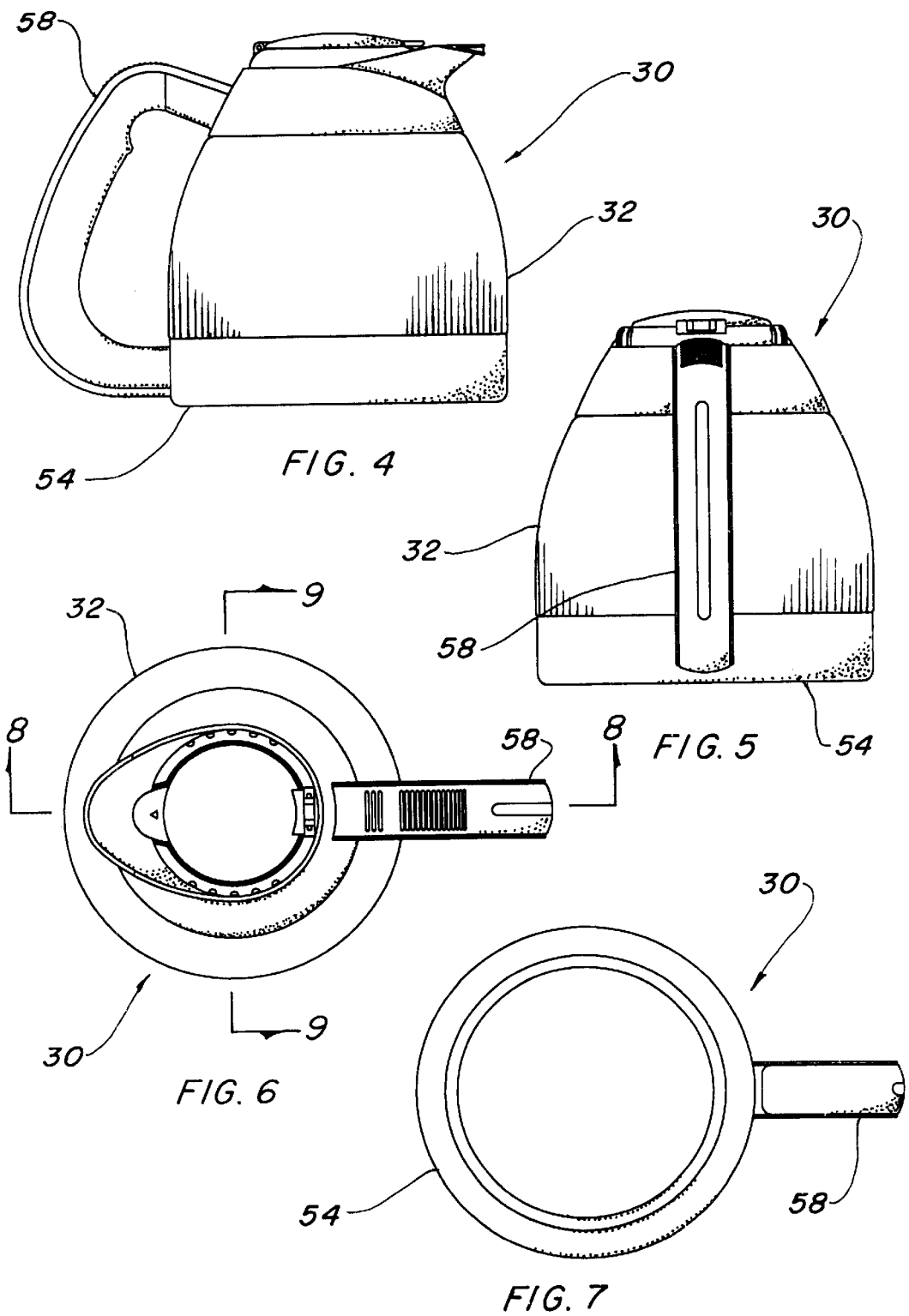

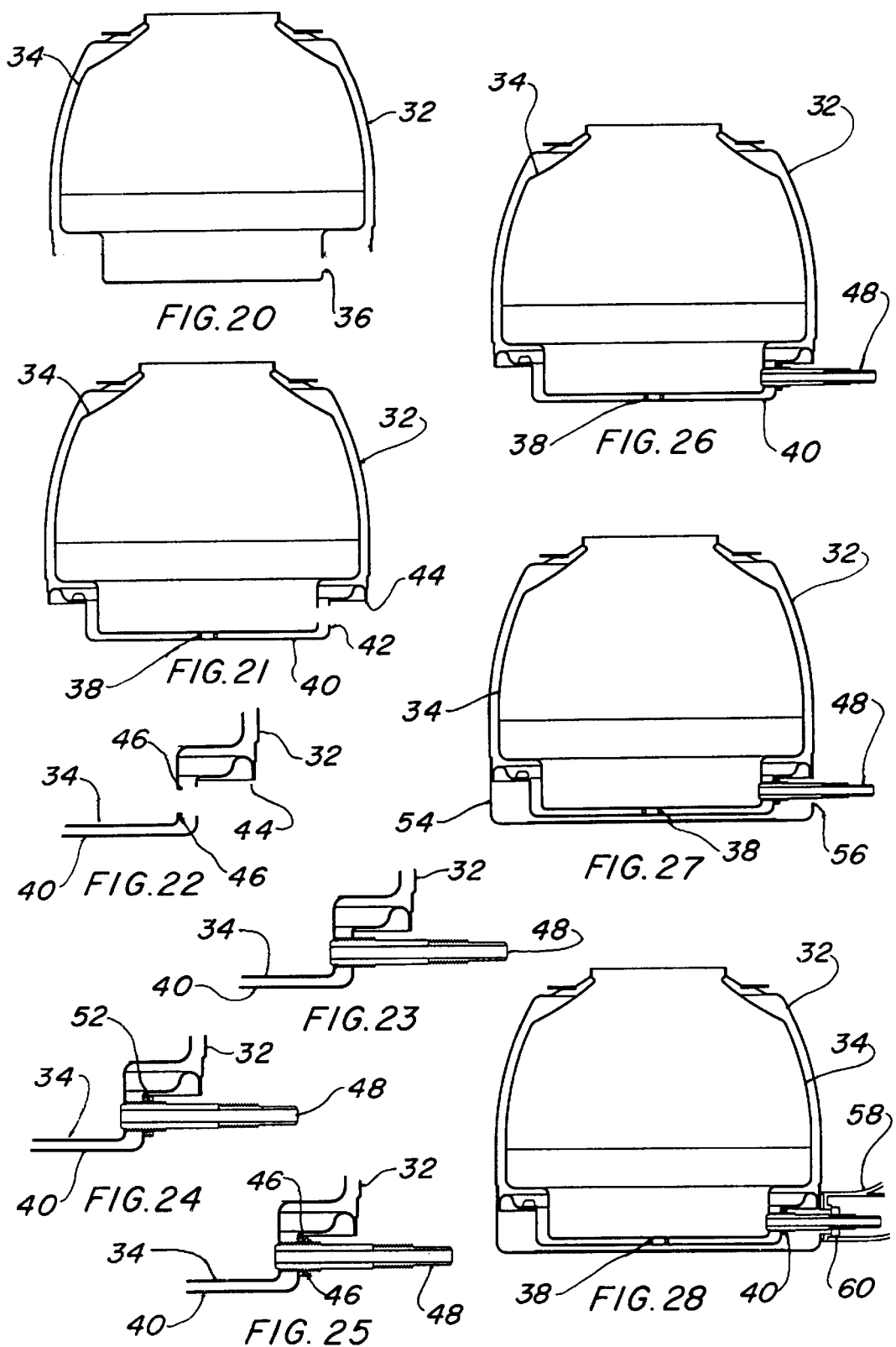

VACUUM INSULATED COFFEE SERVER MANUFACTURING PROCESS

TECHNICAL FIELD

The present invention relates to coffee servers in general. More specifically to a process for manufacturing stainless steel coffee servers to provide communication between vacuum insulated separated walls, using furnace brazing techniques while maintaining structural integrity of the handle connection.

BACKGROUND ART

Previously, many types of coffee servers have been used in endeavoring to provide an effective means to insulate the server using negative pressure as the insulating media. Hitherto the usual manufacturing process used by prior art has been to use vacuum insulation only between the vertical walls, as structural connection for the handle is difficult to achieve if a full vacuum insulation is used completely around the vessel when it is necessary to maintain a connection to the interior of the server.

A search of the prior art did not disclose any patents that possess any of the novelty of the instant invention, however the following U.S. patents are considered related:

| U.S. Pat. No. | Inventor | Issue Date |
| --- | --- | --- |
| Des. 346,933 | Denny et al. | May 17, 1994 |
| Des. 362,156 | Goto et al. | Sep 12, 1995 |
| Des. 362,369 | Bridges | Sep 19, 1995 |
| Des. 372,838 | Feltman et al. | Aug 20, 1996 |
| Des. 373,051 | Kramer et al. | Aug 27, 1996 |
| Des. 386,948 | Wissinger | Dec 02, 1997 |
| Des. 396,777 | Inoue | Aug 11, 1998 |
| Des. 398,187 | Parker | Sep 15, 1998 |
| Des. 411,713 | Bridges | Jun 29, 1999 |
| Des. 416,757 | Ginuntoli | Nov 23, 1999 |
| Des. 425,758 | Kelly-Pollet | Dec 21, 1999 |
| Des. 425,758 | Freed | May 30, 2000 |
| 4,754,888 | Letsch et al. | Jul 05, 1988 |
| 5,249,703 | Karp | Sep 05, 1993 |
| 5,918,761 | Wissinger | Jul 06, 1999 |

Letsch et al. in U.S. Pat. No. 4,754,888 discloses a carafe with an inner container surrounded by a casing. The inner container and the casing have an opening at the top which may be closed by a separate plug. The plug and opening in the container and casing are shaped such that it is possible to fill or empty the inner container while the plug is still in the opening. The plug and container both have mating grooves that provide opposed flow paths into and out of the container. The container also includes a basin around the top for receiving coffee from a coffee maker and the plug has openings to provide a flow path from the basin into the container interior.

Karp in U.S. Pat. No. 5,249,703 teaches a travel mug that includes a container and a lid in combination. The container has a handle and an annular lip that has an annulus capable of forming a seal with the top side of the annular lip. A cylindrical well in the lid has a vertical dividing wall such that the lid may be readily rotated by hand. The retaining arms extend from the underside of the lid and engage the underside of the annular lip to pull it into tight abutment. Diametrically opposed gaps in the lip act as passageway for the retaining arms. Similarly diametrically opposed notches in the lid align with the gaps to allow liquid to be poured from the container.

U.S. Pat. No. 5,918,761 issued to Wissinger is for an insulated container and cover combination that has an outer container shell terminating at an opening with a surrounding edge. An inner container shell is nested within the outer container shell and has an opening surrounded by a continuous edges in abutment with the surrounding edge. The inner container shell is spaced inwardly and is out of contact with the outer shell. A cover mounting assembly is attached to the outer shell adjacent to the opening. A single seal, made of elastomeric material, has a sealing surface disposed at the interface of the shells. Locating rings define the removable cover mounting assembly and locate the single sealing ring on the inner and outer shells.

For background purposes and as indicative of the art to which the invention is related reference may be made to the remaining cited design patents.

DISCLOSURE OF THE INVENTION

Heretofore the art of manufacturing stainless steel coffee servers and other liquid containers that employ vacuum as a thermal barrier for insulation have been limited to the so called double walled type as there has been no successful method of penetrating both sides of the shells simultaneously. Furthermore it is particularly important to indicate how much coffee remains inside the server as the stainless steel construction renders the liquid volume within the interior concealed and out of sight. A liquid level sight gauge has been developed that is housed inside the handle and visually indicates the level through a transparent tube, however the problem of how to attach the handle and provide an opening to the interior and still utilize the vacuum furnace type of construction has prevailed.

It is therefore a primary object of the invention to solve this dual problem by providing a strong robust handle mounting device using a hollow threaded coupling inserted into a hole in both the inside and outside walls of the server and adding a mixture of brazing powder and flux around the interface of the coupling to the holes. When the server is placed in a vacuum furnace, initially evacuated and heated, the brazing compound melts and through capillary action encircles the interface and permanently joins the stainless steel walls to the coupling. Since the coupling is permanently and rigidly attached to both walls, the handle has a solid fixed member to grip against and the transparent tube to indicate liquid level may be easily attached to the couplings open end, forming a conduit for the liquid.

Another difficulty has arisen in the techniques of manufacturing stainless steel coffee servers and other liquid containers that employ vacuum as a thermal barrier has been in the spacing of a base to the outer shell in an accurate and repeatable manner. While this connection is simple by itself the problem is compounded by the need to create a precise welding gap therebetween permitting the height of the server to be controlled and the gap regulated.

To solve this problem an important object of the invention has been realized by simply placing a ceramic ring in between the base and inner liner when positioning them together. This ring acts as a spacer eliminating the need for expensive and elaborate jigs and fixtures to retain the elements separation. Further the ring, being ceramic, may permanently remain in this position without any difficulty as it has a low coefficient of heat transfer and is held in place by compression between the two components since they are held in position by gravity during the welding procedure. It should be noted that this novel addition to the assembly operation produces the proper welding gap regardless of the tolerance build up of the mating elements as the deep drawing procedures and cut off techniques may not always lend themselves to precision dimensional tolerances and excessive gap or misalignment between the elements could lead to voids in the weld seam.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 1 is a partial isometric view of the completed coffee server manufactured by the preferred process.

FIG. 2 is a front view of the completed coffee server manufactured by the preferred process.

FIG. 3 is a right side view of the completed coffee server manufactured by the preferred process.

FIG. 4 is a left side view of the completed coffee server manufactured by the preferred process.

FIG. 5 is a rear view of the completed coffee server manufactured by the preferred process.

FIG. 6 is a top view of the completed coffee server manufactured by the preferred process.

FIG. 7 is a bottom view of the completed coffee server manufactured by the preferred process.

FIG. 20 is a partial cross sectional view of the step of assembling the outer shell to the inner liner and welding them together.

FIG. 21 is a partial cross sectional view of the step of slipping the vacuum base over the inner liner with the ring acting as a spacer therebetween and welding them together.

FIG. 22 is a partial cross sectional view of the step of applying the mixed compound around the hole in the inner liner.

FIG. 23 is a partial cross sectional view of the step of inserting the stepped the threaded coupling trough the bore and hole.

FIG. 24 is a partial cross sectional view of the step of threading the first threaded nut onto the coupling flush with the vacuum base outside surface.

FIG. 25 is a partial cross sectional view of the step of applying the mixed compound around the nut and bore in the vacuum base.

FIG. 26 is a partial cross sectional view of the step of positioning the coffee server in a vacuum furnace and evacuating the furnace then heating until coalescence is achieved with the mixed compound permanently joining coupling to the inner liner and the nut to both the vacuum base and the coupling.

FIG. 27 is a partial cross sectional view of the step of nesting the outer base over the outer shell while aligning the threaded coupling through the aperture permitting the coupling to extend outwardly.

FIG. 28 is a partial cross sectional view of the step of positioning the handle onto the threaded coupling, engaging the outer base and holding it in place with the second nut.

BEST MODE FOR CARRYING OUT THE INVENTION

Figure 17:
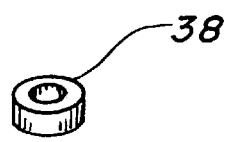
FIG. 17 is a partial isometric view of the flat ceramic ring shown completely by itself for clarity.
Figure 18:
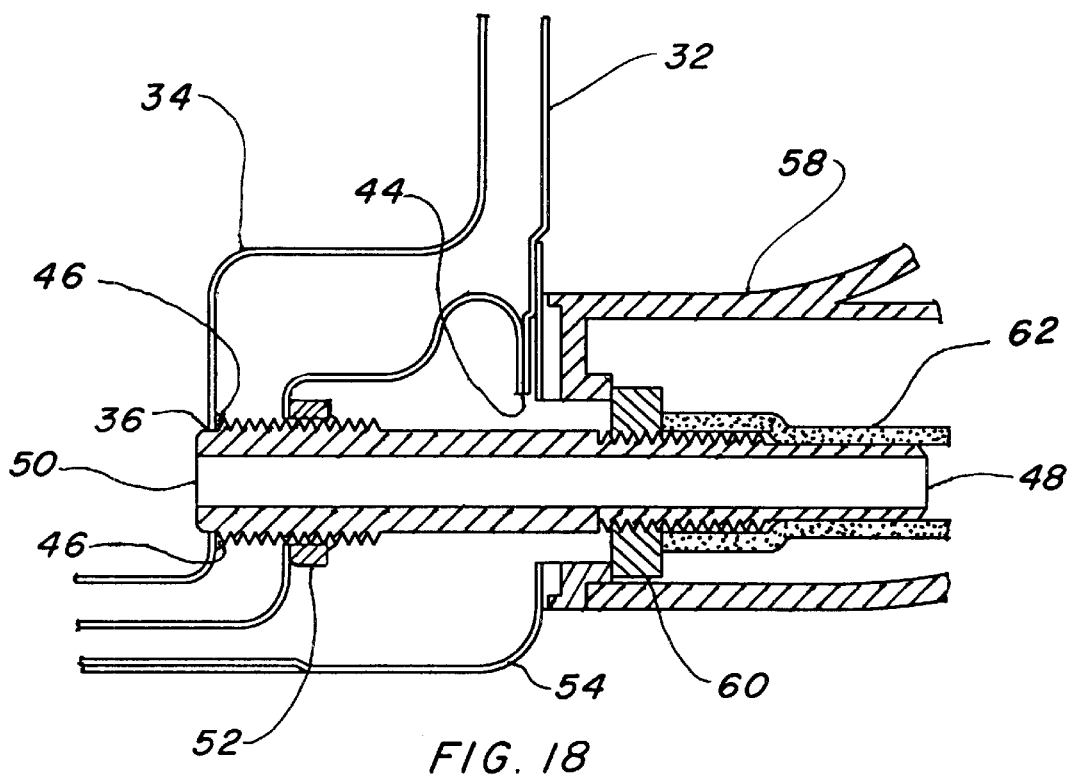
FIG. 18 is a partial cross sectional view of the stepped threaded coupling in its installed position.
Figure 19:
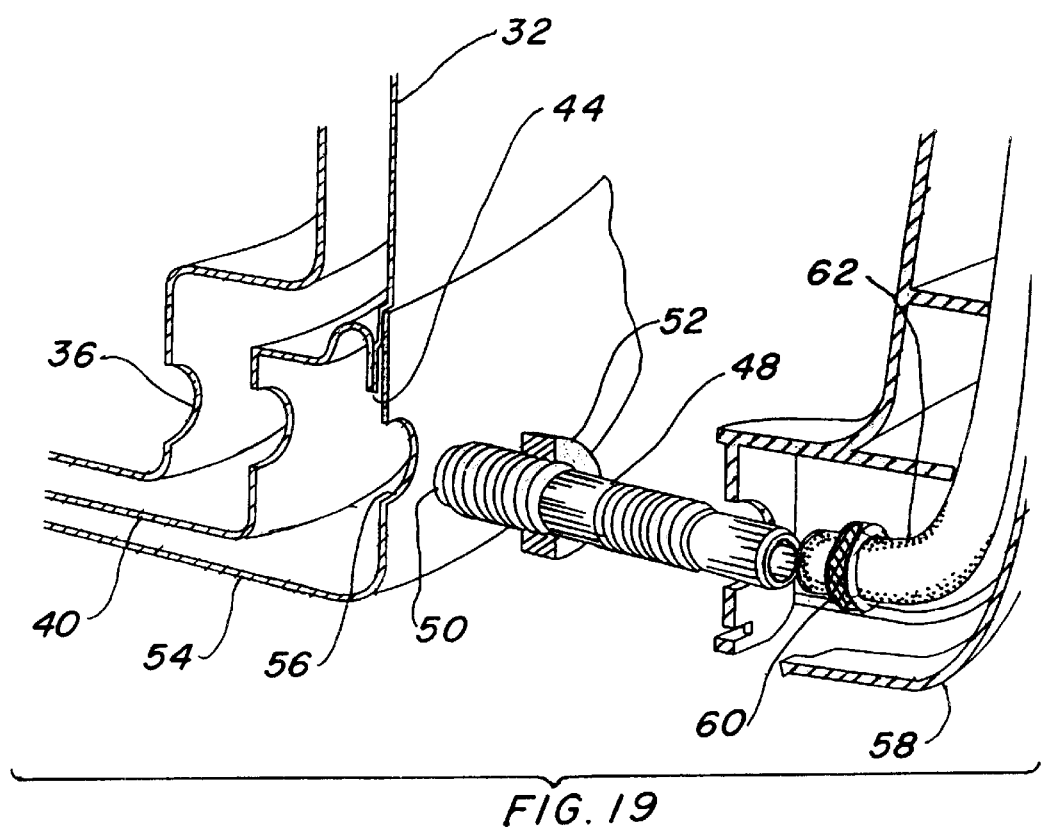
FIG. 19 is a cut away partial isometric exploded view of the stepped threaded coupling with all of its related elements used in the process.

The best mode for carrying out the invention is presented in terms of a preferred embodiment. This preferred embodiment is shown in FIGS. 1 thorough 28 and is comprised of the process for manufacturing a vacuum insulated coffee server. FIGS. 1 to 9 illustrate the completed coffee server 30 including cross sectional views of the interior construction. FIGS. 10 to 17 pictorially indicate the specific individual elements of the invention shown by themselves and FIGS. 18 and 19 illustrate, in blown up and exploded views, the specific construction techniques. FIGS. 20 to 28 illustrate the individual procedures in the manufacturing process.

Figure 8:
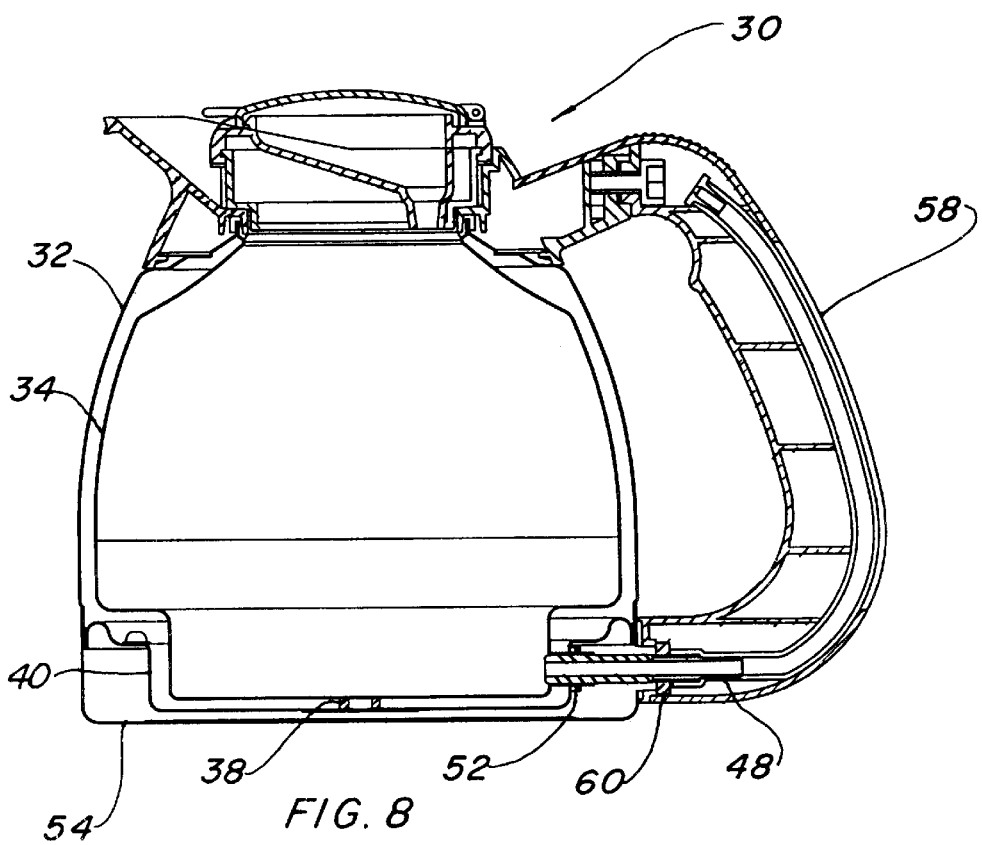
FIG. 8 is a cross sectional view taken along lines 8—8 of FIG. 6.
Figure 9:
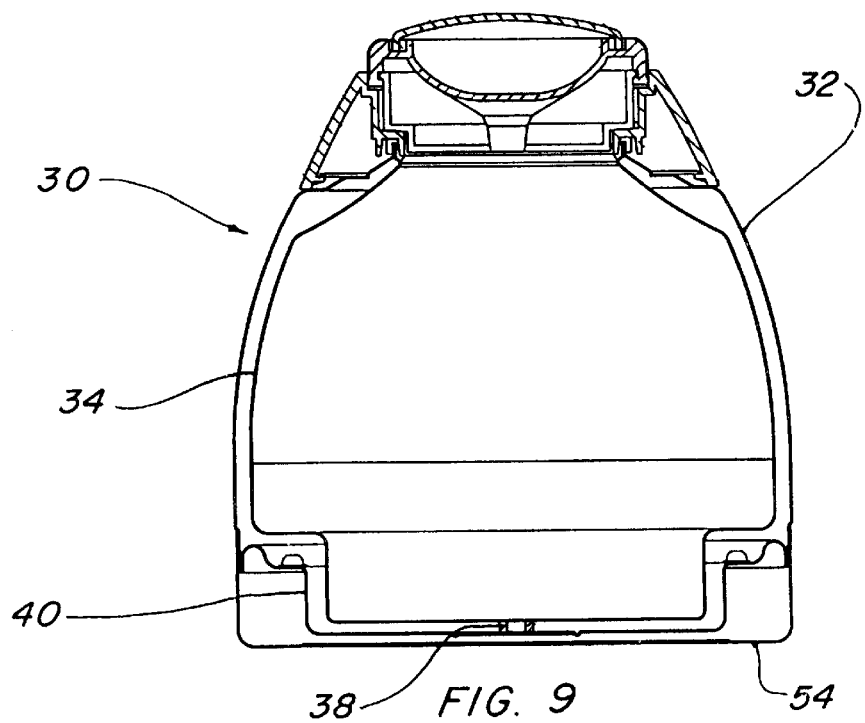
FIG. 9 is a cross sectional view taken along lines 9—9 of FIG. 6.
Figure 10:
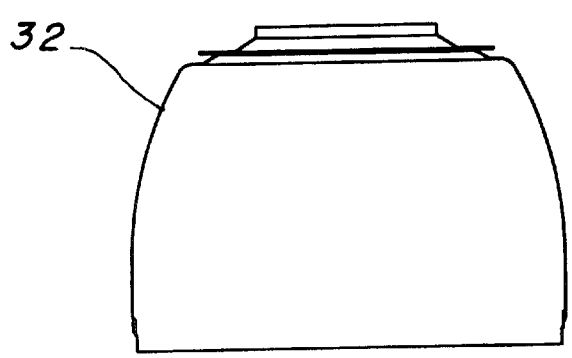
FIG. 10 is a cross sectional view taken along lines the centerline of the outer shell shown completely by itself for clarity.
Figure 14:
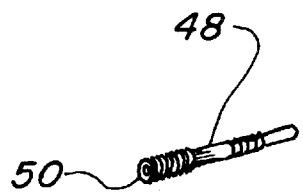
FIG. 14 is a partial isometric view of the threaded coupling shown completely by itself for clarity.
Figure 11:
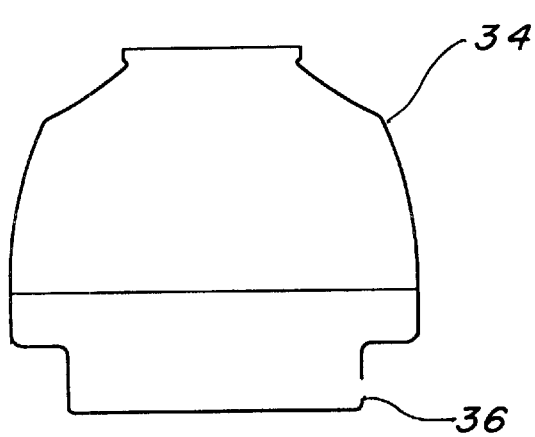
FIG. 11 is a cross sectional view taken along lines the centerline of the inner liner shown completely by itself for clarity.

The steps of the process consist of assembling a coffee server outer shell 32 to a coffee server inner liner 34 and welding the outer shell 32 to the inner liner 34 circumferencially at the shell's and liner's distal top interface. It will be noted that the above elements are stainless steel which is deep drawn into the shapes as illustrated. FIG. 10 illustrates the outer shell 32 and FIG. 11 depicts the inner liner 34 with FIG. 20 showing the assembled combination. The welding is accomplished by fusion with a gas shielded arc which is well known in the art and the liner and shell nest tightly together at the top permitting a butt weld joint to be made at their top interface. It should be recognized that the inner liner 34 has a hole 36 in the lower side as illustrated in FIGS. 18, 19 and 20 to 22.

The next step, shown in FIG. 21, is to place a flat ceramic ring 38 in a cup shaped vacuum base 40, which includes a bore 42 in the base's lower side, and then, positioning the ring 38 in essentially the center of the vacuum base. The vacuum base 40 is then slipped over the inner liner 34 while aligning the bore 42 with the hole 36, such that the ring 38 contiguously engages both the inner liner 34 and the vacuum base 40 acting as a spacer forming a welding gap 44 therebetween. This gap 44 is sized to leave the appropriate space between the elements for optimum welding using fusion with a gas shielded arc. While the physical size of the ceramic ring 38 is not critical, it has been found that an outside diameter of 10 mm and a thickness of 3 mm is ideal for the application in the coffee server 30 as illustrated. The vacuum base is shown alone, removed from the server, in FIG. 12 and the ceramic ring 38 is illustrated in FIG. 17.

The following step is to now weld the vacuum base 40 to the outer shell 32 circumferencially at the welding gap 44 formed by the ring 38, using fusion with a gas shielded arc. This step is illustrated in FIG. 22 as well as FIG. 18.

The next step is applying a mixed compound of brazing powder and flux 46 around the hole 36 in the inner liner 34. This procedure is easily accomplished by reaching through the bore 42 in the base 40 as shown in FIG. 22. The proportions of brazing compound and flux create a paste having a consistency that will hold its shape and adhere to the smooth vertical surface of the inner liner 34 when it is applied thereon through the bore 42. The type of brazing compound and flux is governed by the metallurgical composition and classification of the stainless steel material use in the shell and liner.

After the mixed compound 46 is applied the subsequent step is inserting a hollow stepped threaded coupling 48 through the aligned bore 42 and hole 36 until the coupling's distal end 50 is flush with the inside surface of the inner liner 34 and contiguously engages the mixed compound 46. The threaded coupling 48 is shown by itself in FIG. 14, in the exploded view of FIG. 19 and in cross section of FIG. 18 as well as the assembly step view of FIG. 23.

Figure 15:
FIG. 15 is a partial isometric view of the first internally threaded nut shown completely by itself for clarity.
Figure 12:
FIG. 12 is a cross sectional view taken along lines the centerline of the vacuum base shown completely by itself for clarity.
Figure 16:
FIG. 16 is a partial isometric view of the second internally threaded nut shown completely by itself for clarity.
Figure 13:
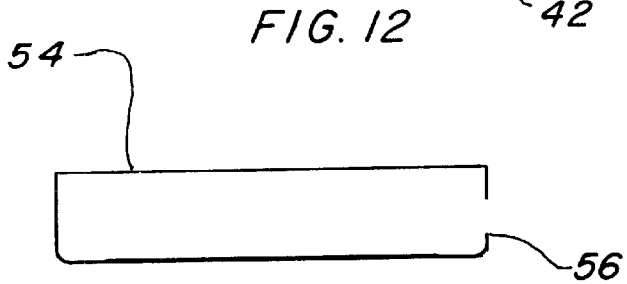
FIG. 13 is a cross sectional view taken along lines the centerline of the outer base shown completely by itself for clarity.

The succeeding step is threading a first internally threaded nut 52, as shown in FIG. 15, onto the threaded coupling 48 and tightening until it is flush with the outside surface of the vacuum base 40, as illustrated in FIG. 24. It has been found that a 10 mm round knurled nut is ideal for the purpose however any size and outside surface may be used with impunity. It should be noted that in place of the first nut 52 the same function may be accomplished using other types of abutment means well known in the art such as a raised shoulder formed integrally with the coupling 48, a tab raised on the surface by compressing the material together appropriately, dimpling the material sufficiently to create a barrier at the correct location and so forth.

The next step consists of applying a mixed compound of brazing powder and flux 46 around the first nut 52 and bore 42 in the vacuum base 40 as shown in FIG. 25. The mixed compound 46 may be the same composition and consistency as discussed previously.

The coffee server 30, assembled thus far, is now ready to be positioned in a vacuum furnace and evacuating the furnace to a level below atmospheric pressure which it is preferred to be a negative pressure from 711.2 to 759.943 mm of mercury. The vacuum furnace is not illustrated as it is well known in the art and used commonly throughout the industry.

While the server 30 is still in the vacuum furnace, the ambient temperature is elevated until coalescence is achieved with the mixed compound 46 permanently joining coupling 48 to the inner liner 34 and the first nut 52 to both the vacuum base 40 and the coupling 48 in a hermetically sealed manner, as illustrated in FIG. 26. Through experience it has been found that a temperature of from 1000 to 1040 degrees Centigrade easily accomplishes the task and permanently brazes the elements together.

The server 30 is then removed from the furnace and a cup shaped outer base 54, having a clearance aperture 56 in its vertical side, is nested over the lower portion of the outer shell 32 while aligning the threaded coupling 48 through the aperture 56 permitting the coupling 48 to extend outwardly as shown in FIG. 27. The outer base 54 as well as the vacuum base 40 is made of stainless steel the same as the shell and liner previously described. The outer base 54 is shown independently in FIG. 13 and in a larger scale in FIGS. 18 and 19.

A handle 58, preferably made of thermoplastic, is positioned onto the threaded coupling 48 contiguously engaging the outer base 54. The handle 58 is shown attached in FIGS. 1, 3, 5 to 8, 18,19 and 28 and may be any shape and type of construction however it is preferred to have a sight gauge in the interior with visual access to the outside surface for ascertaining the coffee level within the server 30.

Finally a second internally threaded nut 60 is threaded onto the coupling 48 and tightened until it is flush with the exterior surface of the outer base 54 securing the handle 58 to the coffee server 30. This second nut 60 is illustrated by itself in FIG. 16 and shown attached in FIGS. 18 and 28. This nut is preferably a 8 mm round knurled nut however any similar nut size and shape may be substituted with equal ease and dispatch.

It will now be easily seen that a transparent level tube 62 may be attached to the extending end of the threaded coupling 48 completing the procedure.

While the invention has been described in complete detail and pictorially shown in the accompanying drawings, it is not to be limited to such details, since many changes and modifications may be made to the invention without departing from the spirit and scope thereof hence, it is described to cover any and all modifications and forms which may come within the language and scope of the appended claims.

What is claimed is:

1. A process for manufacturing a vacuum insulated coffee server comprising the steps of:

a) assembling a coffee server outer shell to a coffee server inner liner, said inner liner having a hole in its lower side, b) welding the outer shell to the inner liner circumferencially at the shell's and liner's distal top interface, c) placing a flat ceramic ring in a cup shaped vacuum base, said vacuum base having a bore in its lower side, further, positioning the ring in essentially the vacuum base's center, slipping the vacuum base over the inner liner while aligning the bore with the hole, such that the ring contiguously engages both the inner liner and the vacuum base acting as a spacer forming a welding gap therebetween, d) welding the vacuum base to the outer shell circumferencially at the welding gap formed by the ring, e) applying a mixed compound of brazing powder and flux around the hole in the inner liner, f) inserting a hollow stepped threaded coupling through the aligned bore and hole until the coupling's distal end is flush with the inner liner inside surface and contiguously engages the mixed compound, g) threading a first internally threaded nut onto the threaded coupling and tightening until it is flush with the vacuum base outside surface, h) applying a mixed compound of brazing powder and flux around the first nut and bore in the vacuum base, i) positioning the coffee server in a vacuum furnace and evacuating the furnace to a level below atmospheric pressure, j) elevating ambient temperature within the vacuum furnace until coalescence is achieved with the mixed compound permanently joining coupling to the inner liner and the first nut to both the vacuum base and the coupling in a hermetically sealed manner, k) removing the coffee server from the furnace and nesting a cup shaped outer base, having a clearance aperture in its vertical side, over a lower portion of the outer shell while aligning the threaded coupling through the aperture permitting the coupling to extend outwardly, l) positioning a handle onto the threaded coupling contiguously engaging the outer base, and m) threading a second internally threaded nut onto the threaded coupling and tightening the second nut until it is flush with the outer base exterior surface securing the handle to the coffee server.

2. The process for manufacturing a vacuum insulated coffee server as recited in claim 1 wherein said outer shell, inner liner, vacuum base and outer base are formed of stainless steel.

3. The process for manufacturing a vacuum insulated coffee server as recited in claim 1 wherein said welding is accomplished by fusion with a gas shielded arc.

4. The process for manufacturing a vacuum insulated coffee server as recited in claim 1 wherein said ceramic ring has an outside diameter of 10 mm and a thickness of 3 mm.

5. The process for manufacturing a vacuum insulated coffee server as recited in claim 1 wherein said mixed compound of brazing powder and flux further comprise, a paste having a consistency that will hold its shape and adhere to a smooth vertical surface when applied thereon.

6. The process for manufacturing a vacuum insulated coffee server as recited in claim 1 wherein said first internally threaded nut further comprises a 10 mm round knurled nut.

7. The process for manufacturing a vacuum insulated coffee server as recited in claim 1 wherein evacuating the furnace to a level below atmospheric pressure further comprises a negative pressure from 711.2 to 759.943 mm of mercury.

8. The process for manufacturing a vacuum insulated coffee server as recited in claim 1 wherein said elevating ambient temperature within the vacuum furnace further comprises a temperature of from 1000 to 1040 degrees Centigrade.

9. The process for manufacturing a vacuum insulated coffee server as recited in claim 1 wherein said handle is constructed of a thermoplastic material.

10. The process for manufacturing a vacuum insulated coffee server as recited in claim 1 wherein said second internally threaded nut further comprises a 8 mm round knurled nut.

11. A process for manufacturing a vacuum insulated coffee server comprising the steps of welding an outer shell to an inner liner, said inner liner having a hole in its lower side, placing a ceramic ring in a vacuum base, having a bore therein, and slipping the base upon the outer shell with the ring touching both the base and the inner liner acting as a spacer forming a welding gap between the outer liner and the base, welding the vacuum base to the outer shell at the welding gap formed by the ring, applying brazing powder and flux around the hole in the inner liner, inserting a stepped threaded coupling, having a first nut threaded thereon acting as a shoulder, through a hole in the inner liner and the mating bore in the base, applying brazing powder and flux around the nut and the bore in the vacuum base, positioning the coffee server in a vacuum furnace and evacuating, while simultaneously elevating the temperature joining the coupling to the inner liner and the nut to both the vacuum base and the coupling, removing the coffee server from the furnace and nesting a cup shaped outer base, over a lower portion of the outer shell permitting the coupling to extend outwardly, and positioning a handle onto the threaded coupling and attaching with a second internally threaded nut.

12. A process for manufacturing a vacuum insulated coffee server comprising the steps of positioning an inner liner, having a hole therethrough adjacent to an vacuum base, having a bore therethrough at a predetermined spaced distance, applying brazing powder and flux around the hole in the inner liner, inserting a coupling, having abutment means on its outside surface, until the couplings distal end is flush with the inner liner inside surface, applying brazing powder and flux around the abutment means and the bore in the vacuum base, positioning the coffee server in a vacuum furnace and evacuating, while simultaneously elevating temperature, joining the coupling to the inner liner and the abutment means to both the vacuum base and the coupling, and removing the coffee server from the furnace and attaching a handle thereunto.

13. The process for manufacturing a vacuum insulated coffee server as recited in claim 12 wherein said abutment means further comprising a plurality of external threads formed upon the coupling and a first internally threaded nut attached thereupon.

14. The process for manufacturing a vacuum insulated coffee server as recited in claim 13 wherein said attaching the handle further comprising, nesting a cup shaped outer base, over a lower portion of the outer shell permitting the coupling to extend outwardly, and positioning said handle onto the threaded coupling and attaching with a second internally threaded nut.

* * * * *